United States Patent
Myerscough

(10) Patent No.: US 9,126,717 B2
(45) Date of Patent: Sep. 8, 2015

(54) CONTAINER

(71) Applicant: Martin Myerscough, Suffolk (GB)

(72) Inventor: Martin Myerscough, Suffolk (GB)

(73) Assignee: GREENBOTTLE LIMITED, Surrey (GB)

(*) Notice: Subject to any disclaimer, the term of this patent is extended or adjusted under 35 U.S.C. 154(b) by 0 days.

(21) Appl. No.: 13/661,951

(22) Filed: Oct. 26, 2012

(65) Prior Publication Data

US 2013/0140353 A1    Jun. 6, 2013

Related U.S. Application Data

(63) Continuation of application No. 12/096,120, filed as application No. PCT/GB2006/004534 on Dec. 5, 2006.

(30) Foreign Application Priority Data

Dec. 5, 2005 (GB) .................................. 0524789.5
Jun. 6, 2006 (GB) .................................. 0611137.1

(51) Int. Cl.
*B65D 25/16* (2006.01)
*B65D 5/60* (2006.01)
(Continued)

(52) U.S. Cl.
CPC ... *B65D 5/60* (2013.01); *B31B 7/00* (2013.01); *B65D 1/0207* (2013.01);
(Continued)

(58) Field of Classification Search
CPC ...... B65D 11/18; B65D 11/188; B65D 13/00; B65D 11/00; B65D 43/162; B65D 43/161; B65D 2251/1016; B65D 7/00; B65D 7/26; B65D 7/28; B65D 9/12; B65D 9/14; B65F 1/0073; B65F 1/0006; B65F 1/06

USPC .................... 220/495.1, 495.06, 737, 495.01, 220/495.08, 694, 752, 756, 771, 4.21–4.23; 222/173, 183, 105, 556, 541.6; 206/216, 223, 218, 736

See application file for complete search history.

(56) References Cited

U.S. PATENT DOCUMENTS

| 1,452,039 A | 4/1923 | Gravel |
|---|---|---|
| 1,549,903 A | 8/1925 | Buel |

(Continued)

FOREIGN PATENT DOCUMENTS

| CA | 1062207 | 9/1979 |
|---|---|---|
| CA | 1206923 A1 | 7/1986 |

(Continued)

OTHER PUBLICATIONS

International Search Report for PCT/GB/2011/000713 dated Aug. 29, 2011.

(Continued)

*Primary Examiner* — Robert J Hicks
*Assistant Examiner* — Kareen Rush
(74) *Attorney, Agent, or Firm* — Buchanan Ingersoll & Rooney PC

(57) ABSTRACT

The present invention relates to a container having a hollow shell defining a body with a dispensing aperture, and a bag within the shell, the open end of the bag extending through the dispensing aperture and being secured with respect to the outside of the shell. The bag is made from a material suitable for containing the intended contents of the container. The shell may be formed from a material that would not be suitable for containing the intended contents of the container alone. The shell may be formed from a biodegradable material, such as wood or paper pulp. The bag may be separated from the main body of the container to allow for separate disposal. The container may be sealed by providing a spout through which the contents of the container are to be dispensed, and by folding the spout over to create a nip which seals the container.

20 Claims, 6 Drawing Sheets

(51) Int. Cl.
| | |
|---|---|
| *B65D 65/46* | (2006.01) |
| *B65D 77/06* | (2006.01) |
| *B65D 5/00* | (2006.01) |
| *B65D 5/30* | (2006.01) |
| *B65D 5/46* | (2006.01) |
| *B65D 5/74* | (2006.01) |
| *B65D 1/02* | (2006.01) |
| *B65D 23/02* | (2006.01) |
| *B65D 23/10* | (2006.01) |
| *B31B 7/00* | (2006.01) |
| *B65D 25/18* | (2006.01) |
| *B65D 25/28* | (2006.01) |
| *B65D 25/42* | (2006.01) |
| *B65D 6/00* | (2006.01) |

(52) U.S. Cl.
CPC .............. *B65D 5/0085* (2013.01); *B65D 5/30* (2013.01); *B65D 5/46* (2013.01); *B65D 5/46072* (2013.01); *B65D 5/74* (2013.01); *B65D 5/746* (2013.01); *B65D 7/00* (2013.01); *B65D 23/02* (2013.01); *B65D 23/102* (2013.01); *B65D 25/16* (2013.01); *B65D 25/18* (2013.01); *B65D 25/2805* (2013.01); *B65D 25/42* (2013.01); *B65D 65/466* (2013.01); *B65D 77/06* (2013.01); *Y10T 29/49826* (2015.01)

(56) References Cited

U.S. PATENT DOCUMENTS

| | | | |
|---|---|---|---|
| 2,562,389 | A | 7/1951 | Piazze |
| 2,681,599 | A | 6/1954 | Young et al. |
| 2,822,965 | A | 2/1958 | Smith et al. |
| 2,841,054 | A | 7/1958 | Muller et al. |
| 2,954,901 | A | 10/1960 | Winstead |
| 3,132,789 | A | 5/1964 | Forrest |
| 3,233,932 | A | 2/1966 | Utterback |
| 3,255,932 | A | 6/1966 | Hunter et al. |
| 3,448,889 | A | 6/1969 | Malpas |
| 3,579,653 | A | 5/1971 | Kuhn |
| 3,610,455 | A | 10/1971 | Greenhalgh |
| 3,819,036 | A | 6/1974 | Weldon |
| 3,941,301 | A | 3/1976 | Jorgensen |
| 4,133,784 | A | 1/1979 | Otey et al. |
| 4,191,320 | A | 3/1980 | Taylor et al. |
| 4,214,675 | A | 7/1980 | Schmit |
| 4,282,984 | A | 8/1981 | Curry, Jr. |
| 4,330,066 | A * | 5/1982 | Berliner ............... 215/12.1 |
| 4,337,116 | A | 6/1982 | Foster et al. |
| 4,337,181 | A | 6/1982 | Otey et al. |
| 4,353,488 | A | 10/1982 | Schneiter et al. |
| 4,380,310 | A | 4/1983 | Schneiter et al. |
| 4,457,455 | A | 7/1984 | Meshberg |
| 4,653,671 | A * | 3/1987 | Duffy et al. ............ 222/105 |
| 4,799,619 | A | 1/1989 | Lee |
| 5,033,647 | A | 7/1991 | Smith et al. |
| 5,054,644 | A | 10/1991 | Greenslade |
| 5,105,976 | A | 4/1992 | Patterson |
| 5,203,470 | A | 4/1993 | Brown |
| 5,299,700 | A | 4/1994 | Beniacar |
| 5,390,553 | A | 2/1995 | Lynn |
| 5,390,814 | A | 2/1995 | Christine et al. |
| 5,390,836 | A | 2/1995 | Faulds |
| 5,411,140 | A * | 5/1995 | Byer ........................ 206/504 |
| 5,429,263 | A | 7/1995 | Haubenwallner |
| 5,454,483 | A | 10/1995 | Ichikawa et al. |
| 5,524,864 | A | 6/1996 | Dubach |
| 5,655,706 | A | 8/1997 | Vandiver |
| 5,704,541 | A | 1/1998 | Mogard |
| 5,714,217 | A | 2/1998 | Andersen et al. |
| 5,789,684 | A | 8/1998 | Masek et al. |
| 5,860,555 | A | 1/1999 | Mayled |
| 5,996,427 | A | 12/1999 | Masek et al. |
| 6,010,027 | A | 1/2000 | Fujii |
| 6,142,344 | A | 11/2000 | Kai |
| 6,196,452 | B1 | 3/2001 | Andrews et al. |
| 6,253,993 | B1 | 7/2001 | Lloyd et al. |
| 6,290,124 | B2 | 9/2001 | Andrews et al. |
| 6,375,040 | B1 | 4/2002 | Allanson et al. |
| 6,454,134 | B1 * | 9/2002 | Aujesky et al. ................ 222/105 |
| 6,523,548 | B2 | 2/2003 | Bouix et al. |
| 6,592,720 | B1 | 7/2003 | Nonomura |
| 6,605,187 | B1 | 8/2003 | Nonomura et al. |
| 6,706,151 | B1 | 3/2004 | Oosthuizen et al. |
| 6,797,120 | B2 | 9/2004 | Nonomura |
| 6,899,793 | B2 | 5/2005 | Nonomura et al. |
| 6,994,772 | B2 | 2/2006 | Kimbara |
| 7,007,825 | B2 | 3/2006 | Crosland |
| 7,048,975 | B1 | 5/2006 | Tojo et al. |
| 7,077,933 | B2 | 7/2006 | Otani et al. |
| 7,204,950 | B2 | 4/2007 | Farha |
| 7,370,788 | B1 | 5/2008 | Otani et al. |
| 7,380,680 | B2 | 6/2008 | Kosmyna et al. |
| 7,753,289 | B2 | 7/2010 | Kosmyna et al. |
| 7,909,964 | B2 | 3/2011 | Nilsson |
| D645,754 | S | 9/2011 | Corbett et al. |
| D645,755 | S | 9/2011 | Corbett et al. |
| 8,162,180 | B2 | 4/2012 | Lips |
| 8,246,784 | B2 | 8/2012 | Nilsson |
| 8,430,262 | B2 | 4/2013 | Corbett et al. |
| 2003/0226773 | A1 | 12/2003 | Shaffer |
| 2004/0045690 | A1 | 3/2004 | Eto et al. |
| 2005/0211754 | A1 | 9/2005 | Fulcher |
| 2008/0210584 | A1 | 9/2008 | Barthel |
| 2009/0057381 | A1 | 3/2009 | Gokhale |
| 2009/0272763 | A1 * | 11/2009 | Hasselstrom et al. ........ 222/104 |
| 2010/0072166 | A1 | 3/2010 | Dickie |
| 2010/0155396 | A1 | 6/2010 | Warner |
| 2011/0220652 | A1 | 9/2011 | Corbett et al. |
| 2011/0290798 | A1 | 12/2011 | Corbett et al. |
| 2012/0024897 | A1 | 2/2012 | Corbett et al. |
| 2012/0132361 | A1 | 5/2012 | Corbett et al. |
| 2012/0145710 | A1 | 6/2012 | Corbett et al. |
| 2013/0206023 | A1 | 8/2013 | Myerscough |
| 2013/0206755 | A1 | 8/2013 | Myerscough |
| 2013/0213597 | A1 | 8/2013 | Myerscough |

FOREIGN PATENT DOCUMENTS

| | | |
|---|---|---|
| CA | 2735866 | 3/2010 |
| CA | 2743234 | 5/2010 |
| CN | 102177077 | 9/2011 |
| DE | 496008 | 4/1930 |
| DE | 4303558 | 8/1993 |
| DE | 4424936 | 1/1995 |
| DE | 20220109 | 4/2008 |
| EP | 026055 | 9/1980 |
| EP | 0134142 | 3/1985 |
| EP | 0225677 | 6/1987 |
| EP | 0253286 | 7/1987 |
| EP | 0180137 | 1/1988 |
| EP | 0302600 | 2/1989 |
| EP | 0302600 A1 | 2/1989 |
| EP | 0567383 | 10/1993 |
| EP | 0590424 | 4/1994 |
| EP | 0590424 A1 | 4/1994 |
| EP | 1221413 | 7/2002 |
| EP | 1266998 | 12/2002 |
| EP | 0777604 B1 | 6/2003 |
| EP | 1104822 | 2/2007 |
| EP | 1880824 | 1/2008 |
| EP | 2331427 | 6/2011 |
| EP | 2379420 | 10/2011 |
| EP | 2338807 | 10/2012 |
| EP | 2361847 B1 | 10/2012 |
| FR | 2801286 | 5/2001 |
| GB | 16490 | 6/1916 |
| GB | 191516490 A | 6/1916 |
| GB | 819176 | 9/1959 |
| GB | 1161713 | 8/1969 |
| GB | 1473698 | 5/1977 |

(56) References Cited

FOREIGN PATENT DOCUMENTS

| | | |
|---|---|---|
| GB | 2019209 | 10/1979 |
| GB | 2077243 A | 12/1981 |
| GB | 2281276 | 3/1993 |
| JP | H01168465 | 11/1989 |
| JP | 3811513 | 5/1995 |
| JP | 09-117322 | 5/1997 |
| JP | 3711777 | 2/1999 |
| JP | 2000335635 | 4/1999 |
| JP | 2000335638 | 5/1999 |
| JP | H11180439 | 7/1999 |
| JP | 2001348063 | 6/2000 |
| JP | 2002002832 | 6/2000 |
| JP | 3954317 | 2/2001 |
| JP | 2001146699 A | 5/2001 |
| JP | 2001163357 | 6/2001 |
| JP | 2003072841 | 8/2001 |
| JP | 2004238078 | 2/2003 |
| JP | 4182520 | 11/2003 |
| JP | 4722477 | 12/2004 |
| JP | 2012501930 | 1/2012 |
| JP | 2013010568 A | 1/2013 |
| KR | 2011006980 | 6/2011 |
| TW | 201144165 | 12/2011 |
| WO | WO 8301605 | 5/1983 |
| WO | WO 9114630 | 10/1991 |
| WO | WO 9216132 | 10/1992 |
| WO | WO 97/46465 A | 12/1997 |
| WO | WO 9746465 | 12/1997 |
| WO | WO 9902415 | 1/1999 |
| WO | WO 0058557 A1 | 10/2000 |
| WO | WO 0161109 A1 | 8/2001 |
| WO | WO 03063658 | 8/2003 |
| WO | WO 03086897 | 10/2003 |
| WO | WO 2004000686 | 12/2003 |
| WO | WO 2005000705 | 1/2005 |
| WO | WO 2006050426 | 5/2006 |
| WO | WO 2007066090 | 6/2007 |
| WO | WO 2008103649 | 8/2008 |
| WO | WO 2010057497 | 11/2008 |
| WO | WO 2009133355 | 11/2009 |
| WO | WO 2009133359 | 11/2009 |
| WO | WO 2009153558 | 12/2009 |
| WO | WO 2010030958 A3 | 3/2010 |
| WO | WO 2011110334 | 3/2011 |
| WO | WO 2011112712 | 9/2011 |
| WO | WO 2011141696 | 11/2011 |
| WO | WO 2011143754 | 11/2011 |
| WO | WO 2011157999 A2 | 12/2011 |
| WO | WO 2011158000 | 12/2011 |
| WO | WO 2012078929 | 6/2012 |
| WO | WO 2013082450 | 6/2013 |

OTHER PUBLICATIONS

Communication Pursuant to Article 94(3) EPC dated Jun. 10, 2009 for EP068204 19.7.
PCT Written Opinion for PCT/GB2006/004534 dated Apr. 25, 2007.
PCT International Search Report for PCT/GB2006/004534 dated Apr. 25, 2007.
Keltie, Statement of Grounds for Opposition for EPB2338807, 17 pages.
Young, D., Notice of Opposition Notes for EPB2338807, 19 pages.
Young, D., Notice of Opposition Notes for EPB2361847, 24 pages.
Non-final Office Action from U.S. Appl. No. 13/665,367, dated Aug. 29, 2013, 11 pages.
Non-final Office Action from U.S. Appl. No. 13/665,428, dated Aug. 29, 2013, 13 pages.
Non-final Office Action from U.S. Appl. No. 13/661,880, dated Mar. 29, 2013, 14 pages.
Non-final Office Action from U.S. Appl. No. 13/661,824, dated Oct. 22, 2013, 11 pages.
Final Office Action from U.S. Appl. No. 12/096,120, dated Oct. 17, 2013, 12 pages.
International Search Report dated Apr. 25, 2007 for International Application No. PCT/GB2006/004534, 7 pages.
Written Opinion dated Apr. 25, 2007 for International Application No. PCT/GB2006/004534, 9 pages.

\* cited by examiner

CONTAINER

RELATED APPLICATIONS

This application claims the benefit under 35 U.S.C. §120 as a continuation of U.S. patent application Ser. No. 12/096,120 filed Jun. 4, 2008 and entitled "Container," which claims the benefit under 35 U.S.C. §371 as a national stage entry of International Application Ser. No. PCT/GB2006/004534 filed Dec. 5, 2006 and entitled "Container Being Provided with An Inner Bag," which claims the benefit of GB 0611137.1 filed Jun. 6, 2006, and GB 0524789.5 filed Dec. 5, 2005, the entire contents of all of which are incorporated herein by reference.

FIELD OF THE INVENTION

The present invention relates to a package and to a method of forming a package. The invention particularly relates to a package that is easily disposable.

DISCUSSION OF THE PRIOR ART

There is a general environmental desire to reduce the amount of waste generated, and to re-use or recycle waste materials where possible. A particular concern is the amount of material used to create packaging, and the problems associated with the recycling of packaging materials.

Various different types of packaging are known for different types of product. The different types of packaging have different environmental issues associated with them, which may include issues associated with the raw materials used for the packaging—for example whether the materials are virgin or recycled, and the disposal or recycling of the packaging materials—for example whether these can be safely disposed of, recycled, or not.

Traditionally, many beverages such as wine, beer and milk have been supplied in glass bottles. The glass used to make these bottles may itself be recycled. However, the energy required to make the bottles is high. Also, the weight of the resulting packaging is high, increasing the amount of energy required to transport the products. Whilst the glass can be recycled, this does require that the bottles are separated from other waste, for example by users separating the glass bottles from other household waste for collection. Therefore, it is often the case that glass bottles are disposed of with other waste. In this case, the glass bottles may be disposed of in a landfill site. This is a problem since, unlike some other forms of waste, glass is not biodegradable. More recently, it has become common to use bottles made from plastics, such as PET, for liquid such as milk and carbonated drinks. In this case, it is common for the bottles to be formed from virgin, i.e. non-recycled, material to ensure that the liquid contained within the bottle is not contaminated as could be the case if the containers were formed from recycled material. Whilst the material itself could be recycled if separated from other waste, as with glass bottles this frequently does not occur due to the need for the waste producer, such as a householder, to separate the containers from other waste material. Again, if the container is disposed of in a landfill site or the like, the bottle is not biodegradable. Also, bottles take up a volume larger than that of the material itself due to their hollow, rigid, structure, and therefore take up an excessive amount of space in a landfill site.

It has also been proposed to package liquid in laminated cardboard containers, for example in Tetra-Packs (Trade Mark). In this case, the cardboard from which the body of the container is formed may be recycled material. The cardboard is laminated with a waterproof coating. This both ensures that the container is able to hold liquid, and also acts as a barrier between the liquid and the cardboard which can prevent contamination of the liquid from the cardboard. This is especially needed where the cardboard is formed from recycled material. A problem with such packages is that they are difficult to recycle, and the waterproof coating prevents them fully decomposing. If it were possible to separate the waterproof coating from the cardboard, the cardboard could be biodegradable. However, this separation is difficult. The problem is exacerbated when a plastics dispensing nozzle or cap is formed as part of the package for dispensing the contents. This is another component that would need to be separated before the container can be recycled or parts of this be allowed to decompose.

In some countries, liquid such as milk is packaged in bags. However, these bags have little structural stability, and therefore are difficult to transport and to stack on shelves. It is known to package wine in wine boxes. These comprise a box body, typically formed of laminated cardboard, which provides the structure for the package. A separate foil bag is provided within the box, the wine being contained within the bag. A dispensing tap is provided on the bag, and in use is arranged to protrude through an opening in the box. For the efficient disposal of such a container, it would be necessary to separate the parts made from different materials, namely the bag from the box, the dispensing tap from the bag, and the lamination from the cardboard forming the box. This separation of integrated components of the packaging is very difficult. Therefore, such packages cannot be disposed of or recycled efficiently.

U.S. Pat. No. 5,996,427 relates to a device for storing a liquid sample, for example a sample of wastewater, water from a river or stream or liquid effluent from a commercial or manufacturing enterprise. It is disclosed that a problem with known sample devices formed from glass or plastics material is that these must be thoroughly washed before they can be re-used to avoid contamination between samples. To overcome this problem, a liquid sample storage device is disclosed comprising a liner-holder formed from a plastics material in combination with a liner. The liner-holder is able to open, for example along a longitudinal hinge, to provide access to the interior of the liner-holder to allow a liner to be positioned within and later removed from the liner-holder. The liner extends through an inlet neck of the liner-holder, and is held in place by a retaining ring that is provided around the outside of the inlet neck of the liner-holder to claim the liner in place. The liner-holder is provided with vents on its top, bottom and sides to allow displacement of the air as the liner fills with liquid.

U.S. Pat. No. 3,255,932 also discloses a container comprising a re-usable, relatively rigid, outer container in combination with a disposable flexible bag contained within and supported by the outer container. According to the disclosure in this document, the bag is formed with an integral spout that can pass through an opening in the upper portion of the outer container. The spout is engageable with the upper portion of the outer container to enable the spout to be closed and to support the bag within the outer container. It is described that the bag, containing milk or other liquid, can be placed in the outer container with the spout of the bag extending through the opening in the lid of the outer container before the end of the spout is removed to open the bag and allow the contents to be dispensed. A cap can be placed over the spout to seal this.

Egg boxes for holding a number of eggs have been formed from a biodegradable material, such as wood pulp, which is vacuum formed by sucking the liquid pulp material onto a mesh mould. Packages of this type can be formed from a single biodegradable material.

This avoids many of the problems associated with the disposal of the products since there is no need to separate components of the package. However, the amount of energy required to dry a moulded container formed from wood pulp is high, and therefore the manufacture of the containers is not without environmental concerns. Furthermore, such packages are not able to contain liquid products since these will return the material forming the package to pulp. Also, where the package is formed of recycled or non-food standard material, it is not suitable for consumable products that come into direct contact with the packaging.

SUMMARY OF THE INVENTION

In accordance with a general aspect of the present invention, there is provided a container comprising a hollow shell defining the container body and including a dispensing aperture, and a bag or liner provided within the shell, the open end of the bag extending through the dispensing aperture of the shell and being secured with respect to the outside of the shell.

The bag or liner is made from a material suitable for containing the intended contents of the container, for example being formed from a moisture resistant or waterproof material where the container is intended to contain liquid.

By providing the bag or liner within the body, with the mouth of the bag extending out of the dispensing aperture of the body and being secured with respect to the outside of the shell, the contents of the container can be introduced and dispensed through the dispensing aperture of the container without coming into contact with any part of the hollow shell, including the inside of the dispensing aperture.

According to a particular aspect of the present invention, the hollow shell is formed from biodegradable material.

It would normally be considered that biodegradable material would not be a suitable material for forming the shell of a container, especially if this was to contain liquids, since liquid would cause the disintegration of the shell. However, the provision of a bag or liner within the shell of the container means the shell will not come into contact with the contents. This means that the hollow shell can be made from materials not normally considered suitable for use in containing product. Even if the product to be contained by the container is a liquid, the hollow shell can be made from a material that would absorb or otherwise be damaged or destroyed by contact with liquid, since the bag will isolate the contents of the container from the hollow shell. Furthermore, since the content will not come into contact with the hollow shell, even if the container is to contain food or drink, the hollow shell could be made from a material that is not normally considered of food standard since the product will be separated from the hollow shell by the bag. This means, for example, that the shell can be formed using recycled material.

The shell may be formed from one or more planar sheets of material which are folded to form the shell. However, it is preferred that the shell is formed by moulding, for example using a vacuum forming technique. This has the advantage that there is a much greater flexibility in the overall shape of the hollow shell than would be the case if the shell was formed by folding planer sheets of material. In particular, where a container is formed by folding one or more planer sheets of material, the overall shape of the container is generally that of a cuboid, with planer faces. However, using vacuum forming techniques, the shell can be formed with planer and curved faces. This enables the container to be shaped as desired for aesthetic and functional purposes. For example, it is possible to provide containers having an overall shape that is particularly attractive, or which is designed to relate to the product to be contained in the container for identification purposes, or may be provided with a raised, recessed or embossed pattern or image. It is also possible to shape the container so that this may be more easily held and manipulated by a user, for example to provide portions for gripping the container during dispensing of the contents. It is, for example, possible to provide handle portions that may be held by the user when dispensing the contents of the container.

It is particularly preferred that the hollow shell is formed from wood and/or paper pulp. This is an example of a biodegradable material, and is also a material that can be formed from recycled material. For example, paper pulp may be formed from waste newspapers. In this case, the material is both recycled and biodegradable.

Where the shell is formed from wood or paper pulp, vacuum forming techniques similar to those used for the formation of egg boxes may be used.

In this case, it is particularly preferred that the shell is formed from paper pulp as this will have a lower moisture content than wood pulp, and therefore will require less energy to dry out than wood pulp.

Where the shell is formed of a combustible material, such as wood and/or paper pulp, the shell can be burnt, potentially generating electricity or other useable forms of energy.

According to a second particular aspect of the present invention, the dispensing aperture of the container is formed as a neck or spout through which the bag or liner extends. In this case, the container is sealed by folding or bending the spout over itself, and retaining the spout in the folded or bent configuration. As a result of the folding or bending of the spout, a nip will be formed in the spout at the point of the fold or bend, and this will create a seal preventing the accidental dispensing of the contents of the container or egress into the container that could contaminate the contents.

The folded end of the spout may be held in place by inserting this into an opening provided in the body of the container, by a band, clip or other mechanical fastener, or by an adhesive portion or tape provided on the spout or body of the container. Where a clip is used, this may be provided as a separate element to be clipped or clamped to the container body and spout, or may be attached to the body of the shell so that the folded over spout clips in or behind the clip portion formed on the body.

By suitably orientating the fold of the spout with respect to any hinge portions of the shell and/or thicker portions of the spout, the spout can be provided with a degree of resiliency such that the spout will revert to its opened, extended position when removed from any retention mechanism, such as a clip or tape. In particular, the spout portion may be provided with a portion extending longitudinally along the spout having an increased or reduced thickness to provide the required resiliency to promote the required folding.

To assist the correct folding of the spout, and to ensure a sharp fold for sealing, a score may be provided on the spout at the desired fold position.

The spout may be formed integrally with the shell, but is advantageously formed as a separate component which is joined to the remainder of the shell.

In alternative aspects of the present invention, other mechanisms can be provided for sealing the container. Such seals may include a plug or stopper which is removable and replaceable in the dispensing aperture of the container, a zipper type seal to seal the end of the bag, either within the shell of the container or outside the container, a foil or other layer which seals the dispensing opening of the container and is peelable or otherwise removable from the opening when the contents are to be dispensed, a seal similar to the seals used on Tetra Pack (Trade Mark) type containers, and a seal in an extended length of the end of the bag, for example achieved by twisting or scrunching the end of the bag.

In all aspect of the present invention, it is preferred that the portion of the bag or liner provided within the hollow shell has a maximum internal volume greater than the internal volume of the shell. In this way, when the container is filled, the hollow shell carries the load rather than the weight of the contents being supported by the portion of the bag or liner within the shell which is suspended around the dispensing aperture of the container.

It is preferred that the bag or liner is secured with respect to the outside of the shell by attaching the bag or liner to the shell at least around the dispensing aperture. This helps ensure that the bag or liner remains closely associated with the hollow shell at least around the dispensing aperture through which the contents of the container will be dispensed.

This also helps ensure that the bag or liner is not pulled further into the hollow shell than desired when the container is filled which could otherwise stretch the bag or liner undesirably on the outside of the shell, or result in additional parts of the bag or liner being left outside the shell, resulting in an excess of material giving a poor appearance to the outside of the container. The bag or liner may be attached by an adhesive, by tape, or by shrink wrapping where the bag or liner is heated to shrink this into contact with the outside of the shell around the dispensing opening. It will be appreciated that the bag or liner can be secured with respect to the outside of the shell in other ways, for example by attaching the bag at other positions on the outside of the shell instead of or in addition to around the dispending opening. Alternatively, the bag may be provided loosely around the outside of the shell and sealed to itself to prevent its movement with respect to the shell.

The bag or liner is advantageously provided loosely within the shell rather than attaching this to the inside of the shell over a large part of its area. This is beneficial as it may be difficult to attach the bag to the inside of the shell over a large area. Further, by providing the bag or liner loosely within the shell, the bag or liner can more easily be removed from the shell. This is especially preferred for recycling purposes.

Where the dispensing aperture is defined by a neck portion or spout, it is preferred that this includes a weakened section around a portion where the bag is joined to the outer surface of the hollow shell, allowing the part of the neck portion distal of the weakened section and the attached bag to be separated from the remainder of the container for removal of the bag from the container. By providing a weakened portion in the neck or spout, when the contents of the package have been dispensed, the end of the neck can be separated from the remainder of the hollow shell. By pulling the separated portion of the neck or spout from the remainder of the shell, the bag or liner is able to be pulled out of the shell. This leaves substantially all of the shell, other than the removed end of the neck or spout, as one component, with the bag or liner and small removed end portion of the neck as the other component. The two components may be disposed of or recycled separately. In one example, the weakened portion of the neck comprises perforations through the shell in the neck or spout region. Since the contents of the container are contained within the inner bag, the perforations in the shell do not allow the contents to be exposed to the environment or contaminated.

In an alternative embodiment where the bag or liner is attached to the shell, the connection between the bag or liner and the hollow shell may be rupturable or may include other means to selectively separate the bag and shell so that the bag can be separated from the outer surface of the shell and removed from the interior of the shell. Again, the removed bag and remaining shell can be disposed of or recycled separately.

Where the hollow shell is formed from a biodegradable material, the shell may be disposed of in a landfill site, on a compost heap of the like, and will decompose. Since the bag will be flexible, even if this is disposed of in a landfill site, the bag will occupy a significantly smaller volume than a conventional glass or plastics bottle. Additionally, the bag may itself be formed of a biodegradable material, and therefore this could also decompose in a similar manner to the hollow shell.

It is preferred that the hollow shell is provided with a moisture resistant covering on the outer surface. This is particularly beneficial where the container may be left in a wet or damp environment in which the structure of the container could be destroyed by moisture. For example, where the container is intended to hold a product that must be kept at a low temperature, there is the risk of condensation forming on the outside of the container if the container is moved into a warm environment. In this case, the condensation could damage the container, and in particular its structural rigidity, if the outer surface were not moisture resistant. Where the outer surface of the hollow shell is covered with a moisture resistant coating, it is preferred that this coating is easily removable from the hollow shell for separate disposal and/or recycling. In one embodiment, the moisture resistant covering on the outside of the container may be formed as an extension to the bag provided loosely insider the container. In another example, the shell may be treated, for example using seize, to give the required moisture resistant properties.

The shell may include an accelerator that helps promote the degradation of the shell after use. Alternatively or additionally, additives may be included which help breakdown the intended content of the container—for example where the container is to carry oil, an additive may be included in the bag and/or the shell which helps breakdown oil over time, increasing the recyclable properties of the container.

It is preferred that the shell is formed as an open shell which is then folded to form the hollow shell. This is especially beneficial where the shell is moulded.

In this way, it is easier to mould the shell than would be the case if the shell was moulded as a hollow component. Where the shell is folded, a hinge could be provided along any suitable side or part of the shell, for example across the bottom of the final container, along one longitudinal side or across one side of the container. Where the shell is folded, the shell may include one or more extension portions or tabs arranged to extend over and attach to another portion of the shell to assemble the hollow shell. Other mechanisms may be provided to assist attachment or connection of the shell, for example tabs provided on one part of the shell that are arranged to be received in slots on another part of the shell, components which provide interference fits etc. As an alternative or in addition to a mechanical connection between the parts of the shell, the shell may be held together by a shrink wrapped film that overlies the outer surface of the shell, by an adhesive or by a label or tape. Alternatively, the shell could be formed in a number of parts which are joined together using similar arrangements as those described above.

The shell may be formed with one or more flanges that are joined together to join one or more parts of the shell. In a preferred example, one such flange may include an opening to define a handle portion for holding the container. In this case, it is especially preferred that an extension piece is provided to fold over the flange so that the handle portion has multiple thicknesses of material to provide a strong handle. The flanges may be held together with a suitable adhesive.

Where the container includes a neck or spout portion, it is advantageous that this is formed as a separate component to the remainder of the shell and is joined to the remainder of the shell after formation. In this way, the neck or spout portion can be formed as a unitary portion, without any joints.

As described above, the bag is preferably provided loosely within the shell, the bag being substantially unattached to the inside of the shell. However, some parts of the bag may be attached to the inside of the shell, for example part of the bottom or side of the bag may be attached to the shell—for example being clamped between two parts of the shell—to ensure that the bag is positioned correctly within the shell. In this case, it is preferred that the bag includes a weakened or rupturable portion adjacent any parts joined to the shell to allow the removal of the bag from the shell. It is particularly preferred that the bag is attached to the bottom of the shell so that, when the container is inverted to dispense the contents of the container, the bottom of the bag is held at the bottom of the container, rather than sliding within the container under the influence of gravity. This greatly assists with the efficiency of the dispensing of the contents of the container.

Whilst it is preferred that the bag or liner is formed separately from the shell, and is provided into the shell either before the shell is finally assembled—for example by folding the parts of the shell or joining the components that form the shell—or after the shell is completed—for example by inserting the bag or liner through an opening, such as the dispensing opening, into the shell, it will be appreciated that the bag or liner may be formed as part of the manufacture and/or assembly of the shell. For example, the shell may be formed and a layer of suitable material be laid on the inside of the shell. When the shell is assembled, for example by folding, the resulting two layers of material will come together and can be joined around an edge to form a sealed bag. For example, the two layers of material may be joined by welding, for example being joined between or outside a flange of the shell.

In one example, the bag or liner may be formed from a plastics material, such as polythene. Suitable materials which are certified as being of food standard include the Starpol 2000, Starpol Blown Film and Polymer 2189/106 films available from Starpol RF Technologies Limited.

The containers may be formed with shapes suitable to ensure that these are able to tessellate to maximise the number of containers that can be stored within an available space—particularly when stored on a shelf. The containers may include portions defining feet which may provide additional strength to the container, and also help ensure that the container is able to stand stably.

The dispensing aperture may be sealed in a number of ways, and is preferably resealable. It will, however, be appreciated that resealing is not needed for all applications. Advantageously, the seal comprises a tamper evidence seal, such that it can be easily determined if the container has been opened.

BRIEF DESCRIPTION OF THE DRAWINGS

The present invention will now be described by way of example with reference to the accompanying drawings, in which.

It will be appreciated that some or all of the features may be used in different aspects of the invention.

DETAILED DESCRIPTION OF A PREFERRED EXAMPLE

Figure 1:
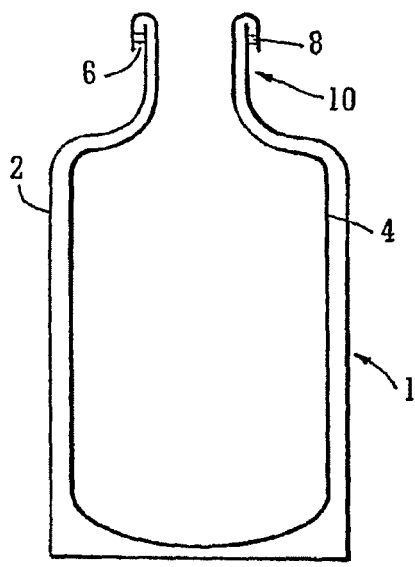
FIG. 1 shows a cross section of a container.

FIG. 1 shows a cross-section of the container 1 according to a first example of the present invention. The container 1 has a hollow shell 2 which may be made from wood or paper pulp by a vacuum moulding method as described in more detail with respect to FIGS. 2 and 3. In other aspects of the invention, other materials, which may or may not be recycled and/or biodegradable may be used. The container 1 includes a neck portion 10 which defines a dispensing opening through which the container can be filled, and through which the contents can be dispensed. The neck portion 10 includes a perforated section 6 surrounding the neck portion 10. As will be described below, the perforated portion 6 enables the top part of the neck portion 10 to be separated and removed from the remainder of the hollow shell 2.

Figure 2:
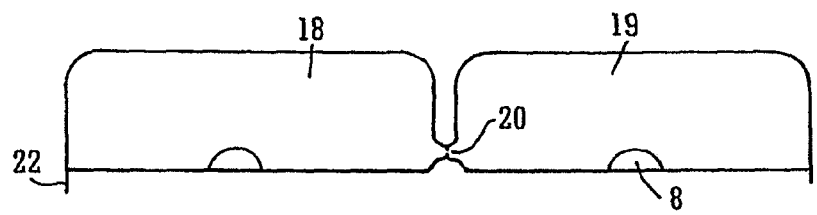
FIG. 2 shows a top view of the shell prior to assembly.
Figure 3:
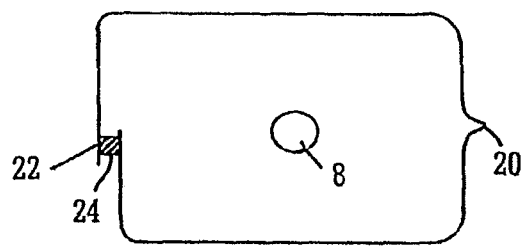
FIG. 3 shows a top view of the shell after assembly.

FIGS. 2 and 3 show the formation of the shell 2. The hollow shell 2 is preferably formed from paper pulp. The paper pulp material is diluted so that this can be a moulded. A mould is provided, typically in the form of a wire mesh, and the paper pulp is sucked onto the surface of the mould by applying a sucking force or vacuum. After moulding the component, the component is heated to evaporate the moisture, and solidify the shell. By forming the shell from paper pulp, rather than wood pulp, less dilution of the pulp is necessary, and therefore less energy is required to evaporate the moisture. As shown in FIG. 2, the hollow shell is moulded in an open condition, with the two halves 18, 19 of the finished product being formed side-by-side, and connected by a hinged portion 20 that will extend along a longitudinal side of the final container. It will be appreciated that the hinged portion could be formed elsewhere, for example along the bottom of the shell or laterally along the side of the shell.

At least one of half 18 of the moulded component includes an extension tab 22 which can be used in connecting the two halves of the shell 1. This is best shown in FIG. 3, where the two halves of the shell have been folded around the hinged portion 20, and where the free ends of the two components overlap and are joined by a suitable adhesive. It will be appreciated that the components can be attached by means other than an adhesive if required. For example, a label could be provided that extends over the join to fix the two parts together, or the entire container could be shrink wrapped to hold it together. In this case, extension tabs may not be required. Alternatively, the shell could be formed with extensions that connect without any additional means, for example by providing an interference fit, a tab and groove or other locking mechanism. In a preferred example described below, the shell includes one or more flanges which are able to be adhered to each other when the shell is closed. It will be appreciated that even when the container is to hold a fluid, it is not necessary for the join to be fluid tight, since the contents are held within a bag provided within the shell. Indeed, it is advantageous that the shell is not fluid tight so that air within the shell can be displaced through the shell as the bag is filled, and that air can pass through the shell to fill the volume as contents are dispensed from the bag. Allowing air to pass into the volume inside the shell as the contents are dispensed from the bag helps ensure smooth dispensing of the contents. The flow of air through the shell may be achieved using the porosity of the shell, or by including a vent in the shell. In the latter case, this is provided at a position where there is little risk of puncturing the bag.

In an alternative example, the hollow shell may be formed as a number of separate parts, which are placed and joined together to form the finished, hollow, shell. In particular, the neck portion may be formed as a separate part that is joined to the remainder of the shell. This is described in more detail below.

Figure 1A:
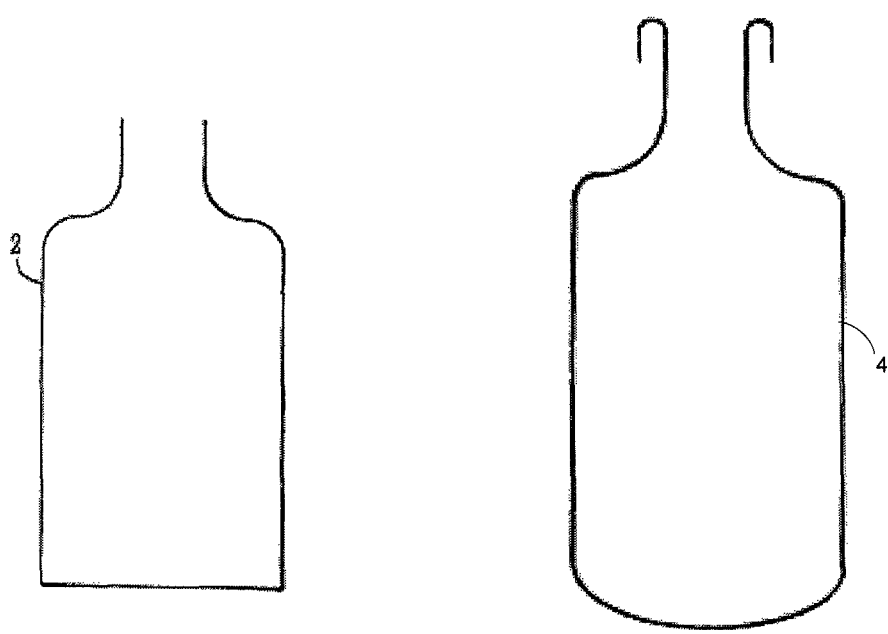
FIG. 1a shows a cross section of the separate shell and liner of the container in FIG. 1.

By forming the shell 2 from wood or paper pulp, the shell can easily be disposed of, since this is a biodegradable, and therefore will decompose naturally. However, it will be appreciated that other materials may be used, and other formation techniques may be used. For example, it may be possible to mould the component is a single hollow component, without requiring the additional steps of folding and fixing as described above. It is not necessary that the shell is formed from biodegradable material, although this is clearly preferred. As shown in FIG. 1, a flexible bag 4 is provided inside the hollow shell 2 of the container 1. As shown in FIG. 1a, the bag 4 can have a maximum internal volume greater than the internal volume of the shell. The flexible bag 4 may be formed from a suitable plastics material, such as polythene. It will then be appreciated that where the container is to include food or beverage, the bag 4 should be made of a material that is of food standard. Suitable materials which are certified as being of food standard include the Starpol 2000, Starpol Blown Film and Polymer 2189/106 films available from Starpol RF Technologies Limited.

The open end of the bag 4 extends through the dispensing opening of the hollow shell 2, and extends over the outside of the neck portion 10. The end of the bag 4 is connected to the neck portion 10, for example by an adhesive 8, or by tape. The connection between the bag 4 and the neck 10 is provided on the portion of the neck 10 that will be removed by tearing the perforated portion 6. The main body of the bag 4 is loosely provided within the hollow shell 2, and in particular is not attached to the body of the hollow shell 2. If desired, the bag 4 could be attached to the inner side of the hollow shell in the part of the neck 10 that is to be removed when the perforated portion 6 is torn.

In an alternative example, the bag may be formed as part of the formation of the shell. In this case, the shell may be formed as described, and a double layer of film laid between the two parts of the shell prior to these being folded together. Prior to, as part of or after the hollow shell is formed, a seal can be formed between the two layers of film sealing this around a periphery to define the bag. This sealing could be achieved by heat welding the film as part of the process for joining the sections of the shell, or after the shell is folded into place.

In use, the container can be filled with liquid or other product to be packaged by introducing this through the dispensing aperture. The contents are then stored in the container until they are dispensed through the dispensing aperture. When all the contents have been dispensed, and it is desired to dispose of the package, the end of the neck portion 10 is removed by tearing the perforated portion 6. As the end of the neck portion 10 removed from the container 1 is attached to the end of the bag 4 by the adhesive 8, and as the remainder of the bag 4 is not attached to the inside of the hollow shell 2 of the container 1, the entire bag 4 can be pulled through the neck 10 of the container and removed with the end portion. By removing the bag 4, the hollow shell 2 can be disposed of separately from the bag 4.

In some cases, it may not be necessary to provide the neck portion with a perforated or weakened section to enable removal of the bag. For example, the bag may be connected to the outer surface of the shell in a manner that allows this to be separated from the shell—for example by rupturing the bag or though the use of a suitable adhesive, such as a peelable adhesive. In this case, the bag can be separated from the outer surface of the shell and the remainder of the bag can be pulled from within the shell.

Further still, in some aspects or examples of the invention, it may be considered unnecessary to remove the bag from the shell, and in this case there will be no need to provide a means allowing the bag to be separated from the main body of the shell of the container.

In the preferred example, where the hollow shell is formed from a biodegradable material, the shell can be disposed of on a compost heap. The bag 4, which may not be formed of a biodegradable material, can be either recycled, or can at least be disposed of in the most suitable way for such a material. It would be appreciated that the bag 4 itself could be formed from a material that decomposes, and in this case this could also be disposed of on a compost heap. In this case, the advantage of removing the bag 4 from the container 1 is that the two components can be disposed of in the most suitable way. A further advantage of the present invention is that the shell 2 can be formed from a non-food standard material, which does not need to be moisture resistant, since they bag 4 separates the contents from the shell.

Although the bag does not need to be connected to the interior of the hollow shell, and should generally be provided loosely within the shell to ensure that the bag can be removed from the shell, it is possible for parts of the bag to be connected to the interior of the shell. In particular, some of the edges or bottom of the bag may be connected to the edges or bottom of the shell. This helps ensure that when the contents of the container are dispensed, the bag does not move around within the shell which could result in a sudden redistribution of the contents, leading to spillage. One way to attach parts of the bag to the container would be to sandwich parts of the bag between the parts of the shell, or to adhere parts of the bag to the interior of the shell with a suitable adhesive. The bag may include perforations or other weakened portions around the points where it is attached to the shell to assist with the removal of the bag from the shell after use.

Figure 4A:
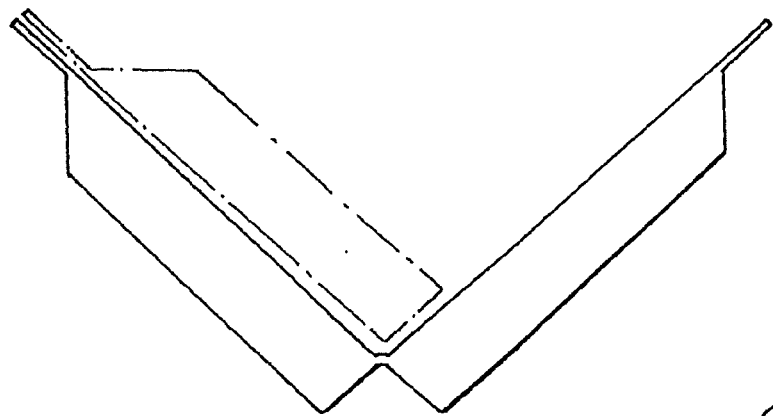
FIG. 4A shows a side view of an alternative shell in its open condition in solid lines, with the shell in its assembled condition shown in dotted lines.
Figure 4B:
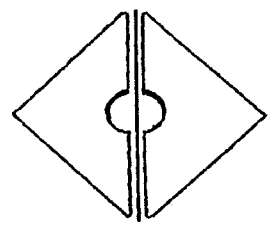
FIG. 4b shows the top view of the shell of FIG. 4A when assembled.

FIGS. 4A and 4B show an alternative example of a hollow shell for use in forming the container of the present invention. In this case, FIG. 4a shows a side view the shell in its open condition in solid lines, with the shell in its assembled condition shown in dotted lines. FIG. 4b shows the top view of the shell when assembled. In this case it will be seen that the two sections of the shell are to be connected from corner to corner rather than along opposed sides on the final container.

Figure 5:
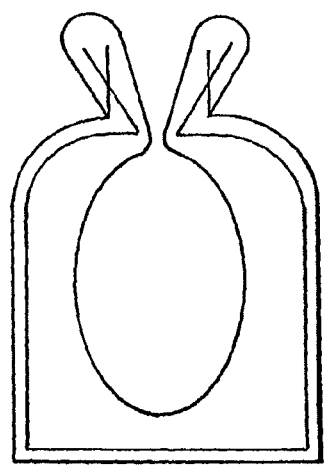
FIG. 5 shows a cross section of an alternative example of a container.

In the example shown in FIGS. 4A and 4B, no flanges are provided to connect the respective sections of the shell. Instead, in this example, a shrink wrapped moisture resistant coating is formed on the outer surface of the container, for example as shown in FIG. 5, and this acts to hold the sections of the shell together. It will be appreciated that the use of interlocking tabs, flanges for adhering or otherwise attaching parts of the shell together, adhesive labels and the wrapping of the outside of the shell are suitable means of assembling the shell according to any aspect or example of the present invention, and any suitable attachment means may be used.

In FIG. 5 it will be seen that the bag provided within the hollow shell is arranged to extend over the outer surface of the hollow shell to provide a moisture resistant coating on the outer surface of the container. In this case, the extended portion of the bag may be attached to itself to fix the bag with respect to the outer surface of the shell. In this way, there does not need to be any permanent and physical attachment of the bag to the outer surface of the shell. This may assist when the bag is to be removed from the shell. In particular, the bag may be provided with a tear strip to allow the bag to be split, and then separated from the shell. However, it is preferred that the bag is attached to the shell at least around the dispensing opening. In the example shown in FIG. 5, the neck portion of the shell flares outwardly. When the end of the bag is passed over the neck and remaining outer portion of the hollow shell and shrink wrapped, the bag will contract around the narrow neck of the flanged dispensing opening, thereby securing the bag around the dispensing opening.

Figure 6A:
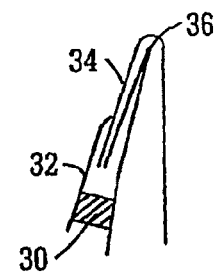
FIGS. 6A and 6B show different views of the neck of the container when closed.
Figure 6B:
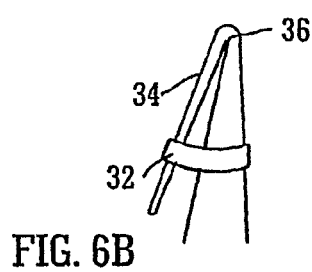

FIGS. 6A and 6B show an example of a seal for the container of the preferred embodiment of the present invention. It will be appreciated that a conventional closure, for example a screw cap, could be used. However, there may be difficulties and limitations associated with this, for example in providing a suitable neck portion of the container to enable a screw cap to be fitted on to be neck, and also this may raise the issues regarding the disposal of the container after use. This is a particular problem, since different materials must be separated for efficient recycling or disposal. Therefore, if the neck includes a portion enabling this to receive a screw cap, it is likely that this would need to be separated from the remaining decomposable material after use.

Alternatively, a bung could be provided to plug the open end of the neck of the container. Such a bung should be formed from or covered by a material that is suitable for coming into contact with the intended contents of the container. For example, where the container is intended to contain a beverage, the bung should be formed from or be covered in a material that is both of food standard and resistant to liquid.

In the example shown in FIG. 6a, the neck portion of the shell is arranged to be folded over to seal the dispensing aperture of the container. In particular, the end portion 34 of the neck or spout is folded over sharply to nip the two sides of the neck at the fold 36. To help facilitate the folding of the neck and the creation of a sharp nip to create the required seal, a score may be provided across the spout, ideally across the entire width of the spout, along which the spout is folded. By folding the neck portion over, the contents of the container can be retained within the container without requiring additional means for sealing the container. In this case, it is preferred that an adhesive tape 32 is used to retain the neck portion in its folded condition. As can be seen in FIG. 6a, the tape 32 is attached to the end 34 of the neck, and includes an adhesive portion 30 at its other end.

This adhesive portion 30 allows the adhesive tape 32 to be adhered to a lower portion of the neck. The adhesive tape can be arranged to extend at least partially around the neck of the container to act as a tamper evident seal, it being apparent when the tape has been removed or ruptured to show when the container has been opened. In one example, the tape extends around the folded over neck, as shown in FIG. 6b.

Figure 7A:
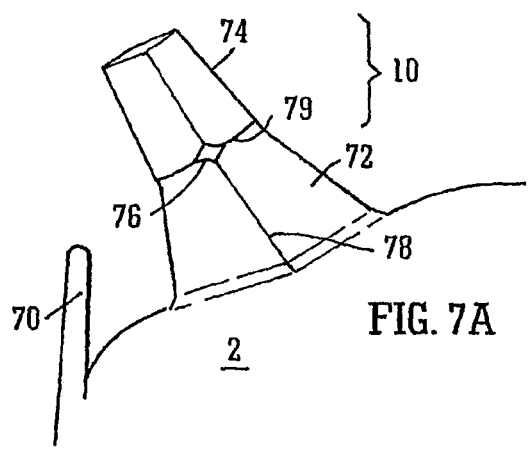
FIGS. 7A-7C show multiple views of an alternative example of a neck closure.
Figure 7B:
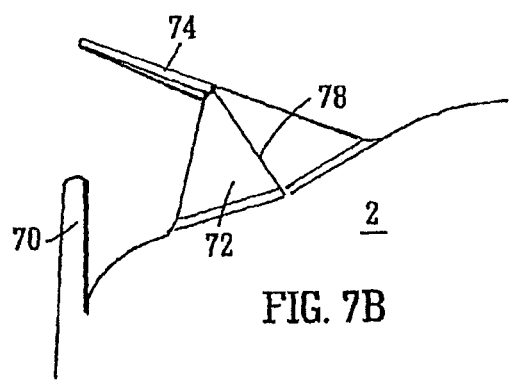
Figure 7C:
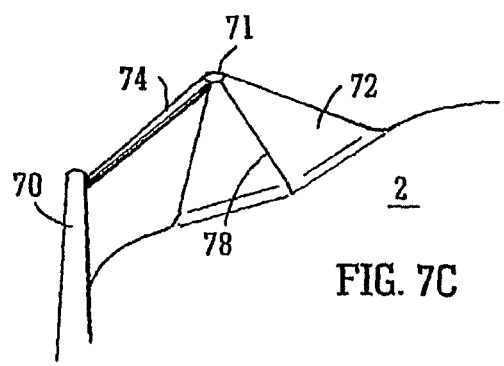

FIGS. 7A-7C show an alternative example of a seal formed by folding a neck or spout of the shell including the dispensing aperture. In this example, the neck 10 is formed as an extension to the shell 2 of the container. The shell 2 and neck are formed from a pulp in a moulding process. The neck 10 has a lower part 72 and an upper or end part 74 which includes the dispensing opening. When the container is to be closed, the upper part 74 is folded over, generally along a fold line 79 with respect to the lower part 78, forming a nip 71 between the two parts to create the seal. The end 74 is received behind a clip 70 provided on the body 2 of the container to keep the container closed.

As shown in FIG. 7a, a ridge portion 78 can be formed along the length of the neck. A small opening 76 is provided at the point along the ridge portion 78 where the neck is to be folded. The neck 10 will be folded over the hinge running along the longitudinal side of the container and neck. This provides strength to the neck and gives this some resiliency, causing the neck to try and revert to its normal position as shown in FIG. 7A for dispensing the contents of the container. The opening 76 assists in permitting the folding of the neck at the desired point.

As shown in FIG. 7b, as the end 74 of the neck 10 is folded over, the dispensing opening tends to close, and the remainder of the neck 10 is deformed. As shown in FIG. 7c, the end 74 can be received behind the clip 70 provided on the body of the container. In this position, the neck is bent over along a fold line producing the nip 71 which ensures that the container is sealed. The resilience of the neck causes the end 74 to press against and be held by the clip 70. In this way, the neck 10 is held in position. To open the container, the end 74 of the neck 10 is pulled from behind the clip 70. The resilience of the neck 10 will cause this to revert to the position shown in FIG. 7a to permit dispensing of the contents of the container.

In the embodiments described with respect to FIGS. 7A-7C, the neck portion of the hollow shell is described as being formed with the hollow shell. However, the neck portion may be formed as a separate component, and joined to the body of the hollow shell.

When the neck portion is formed integrally with the body of the hollow shell, the neck portion of the shell will generally include a joint, fold or seam running longitudinally along at least one side of the neck portion. This is a potential point of weakness or failure of the neck portion, especially where the neck is to be folded over to seal the container. By forming the neck portion separately from the remainder of the container, this can be formed as a unitary portion without any joints extending longitudinally along a side of the neck portion. In particular, the neck portion may be formed as a generally tubular or frusto-conical component. If desired, the neck portion may be formed with portions of increased or reduced thickness, for example running longitudinally along an outer side wall of the neck portion, to help ensure that the neck portion folds or bends in a desired manner.

The neck portion may be formed with a flange or extension member on or around the bottle of the neck portion for connection of the neck portion to the remainder of the hollow shell. In this case, the flange or extension member may be connected to the main body of the shell by adhesive, or by a mechanical connection.

Where the neck is formed as a separate portion to the remainder of the shell, this can be attached to the shell before the bag is inserted into the shell.

Alternatively, the neck may be provided on the bag before the bag is introduced into the main body of the shell, the neck being positioned and joined to the shell during the introduction of the bag into the shell. Further still, the neck could be joined to the shell after the bag has been introduced into the remainder of the shell.

Figure 8:
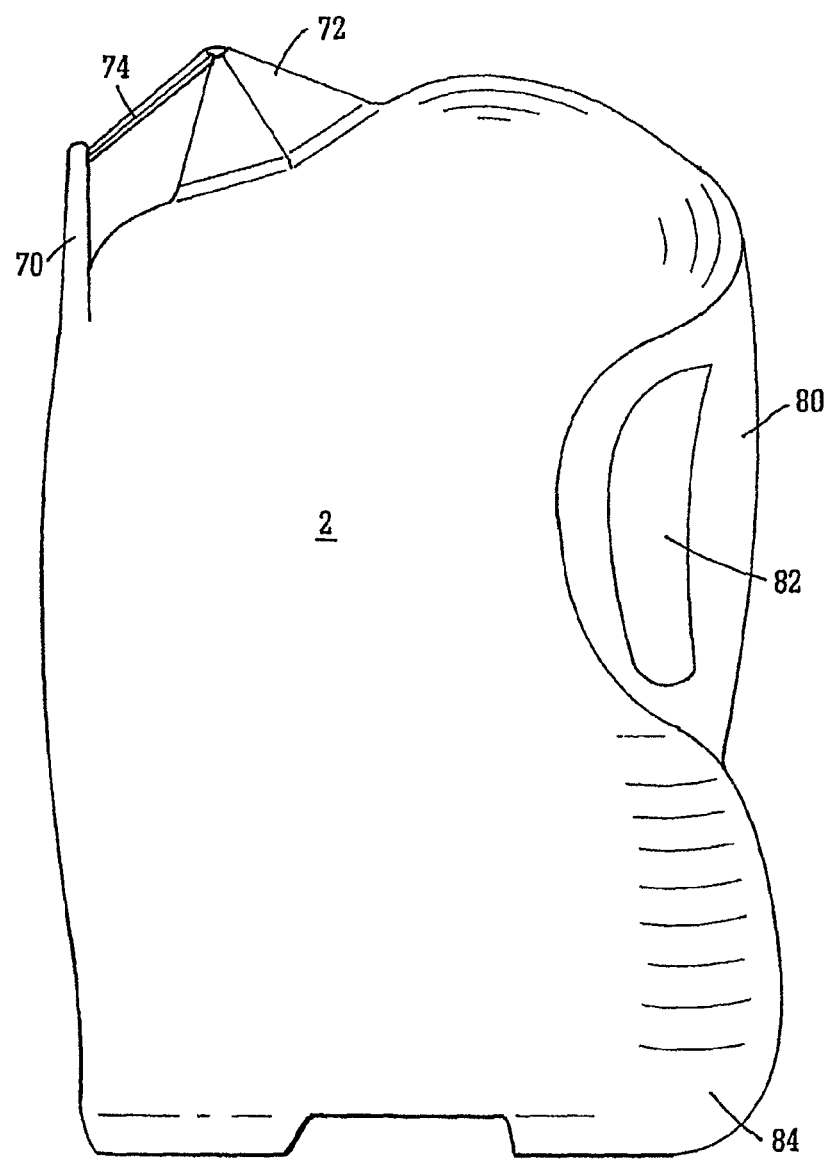
FIG. 8 shows a preferred example of a container including the closure of FIGS. 7A-7C; and, FIG. 9 shows a further example of a container according to the present invention.

FIG. 8 shows a side view of a container including the closure arrangement of FIGS. 7A-7C. It can be seen in this example that the container includes feet 84 which can increase the structural stability of the container and also provide additional stability. The container is also shaped with a recessed portion which accommodates flanges 80. These can be held together by adhesive or tape, and may include additional or extension pieces that fold over the flange to increase the number of layers of material forming the flange to increase the strength of this portion. An opening 82 is provided in the flange 80 to provide a handle.

Figure 9:
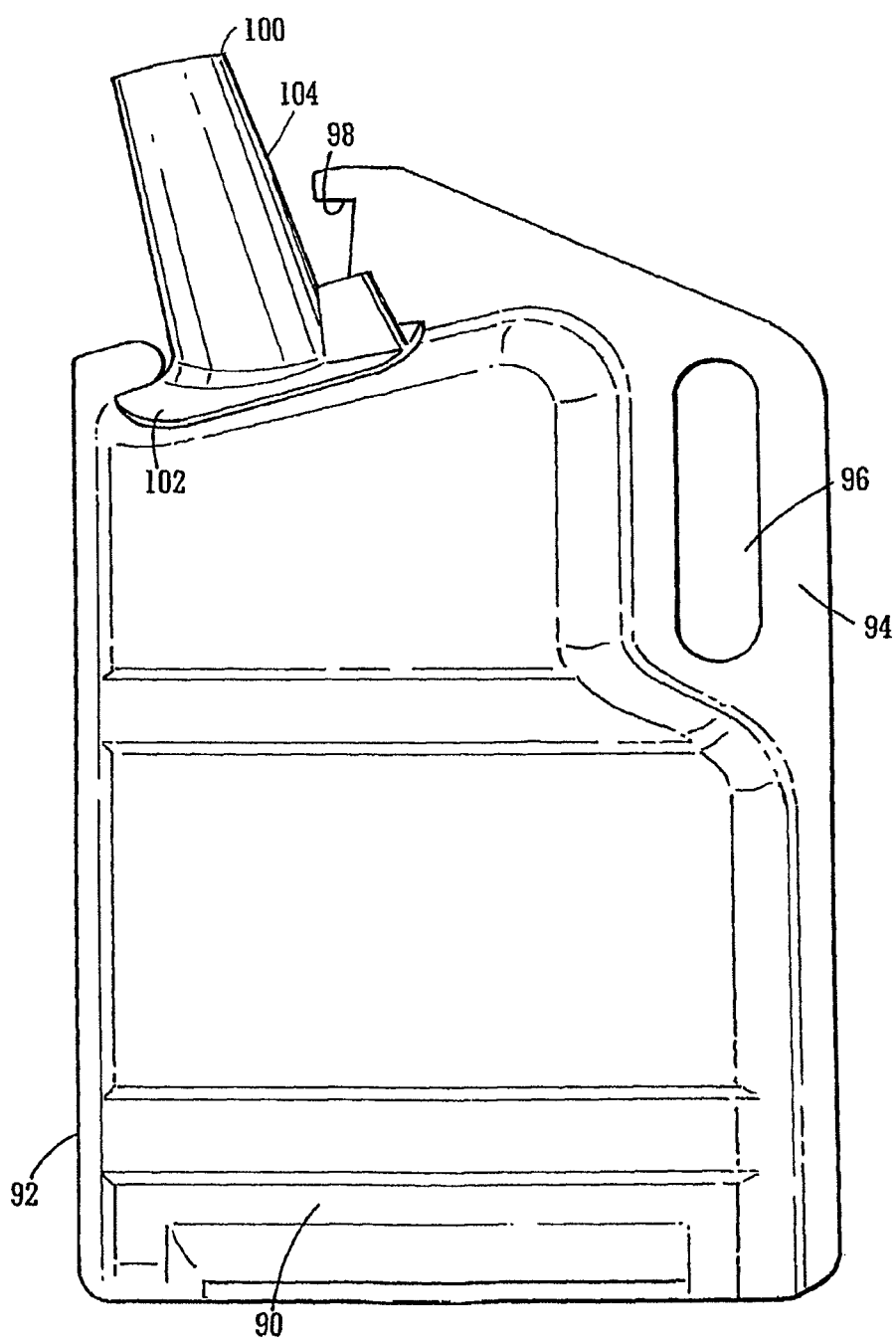

In the example shown in FIG. 9, the spout 100 is formed as a generally frusto-conical moulded element from paper pulp using vacuum forming techniques. The spout 100 is attached to the shell 90 of the container by an adhesive attaching a flange 102 of the spout 100 to the outer surface of the shell 90 around an opening thereof. The spout 100 can be attached to the remained of the shell 90 before the bag is inserted, may be attached after the bag has been inserted into the remainder of the shell 90 such that the open end of the bag is pulled through the spout 100 after this is attached, or the bag may be provided in the spout 100 before the spout 100 is attached to the remainder of the shell 90, the main body of the bag being inserted into the remainder of the shell 90 as part of the attachment of the spout 100 to the remainder of the shell 90. The shell 90 is also formed from paper pulp that is moulded using vacuum forming techniques, and which is formed in an open structure with a hinge 92 joining the two halves of the shell. Flanges 94 are provided around the three sides of each half of the shell that are not joined by the hinge 92. The two halves of the shell are folded about the hinge 92 to bring the flanges 94 into facing engagement, and these are adhered to each other to form the shell. The joined flanges 94 have an opening 96 to act as a handle, and a recess 98 towards the top of the container that can receive the end. of the spout 100 when this is folded over to close the container by forming a nip in the spout 100. The spout 100 includes a lateral score 104 across its width to facilitate the folding of the spout 100 to create a sharp crease to seal the container. A bag is provided within the shell 90. The bottom of the bag is attached to the bottom of the shell 90, and the open end of the bag extending through the opening of the main body of the shell and through the open end of the spout 100, the bag being attached to the outside of the spout 100 by an adhesive or tape. When the contents of the container are to be dispensed, the container is tipped up or inverted so that the contents pass through the open neck of the bag in the spout 100. As the bottom of the bag is held in the bottom of the shell 90, the contents are able to be dispensed without risk that the bag folds over or crumples within the shell 90 trapping some of the contents. When the contents have been dispensed, the attachment of the bag to the outer surface of the spout 100 can be ruptured or otherwise split to separated the bag from the outer surface of the spout 100. The bag can then be pulled from the container and be disposed of separately from the shell, the pulling of the bag from the shell separating the connection between the bottom of the bag and the bottom of the shell.

The invention claimed is:

1. A container comprising:
 a hollow shell defining the container body and including a dispensing aperture, the hollow shell being formed from a recycled and/or biodegradable pulp material, the shell being molded as an open shell which is folded to form the hollow shell or in which the shell is formed from a plurality of separate parts which are joined together to form the hollow shell, the shell being provided with a raised or embossed pattern or image;
 a bag or liner provided within the shell; and
 a neck portion formed as a generally tubular or frusto-conical component, the neck portion positioned adjacent to the dispensing aperture such that material within the bag or liner is dispensable from the bag or liner via the neck portion, the neck portion having a joint, fold, or seam running longitudinally along at least one side of the neck portion such that the neck is foldable over the joint, fold, or seam to seal the container.

2. A container according to claim 1 in which the shell is shaped to provide portions for gripping the container during dispensing of the contents.

3. A container according to claim 1, in which the bag or liner is arranged to contain contents of the container for dispensing through the dispensing aperture of the hollow shell.

4. A container according to claim 1, in which the hollow shell is formed from wood pulp or paper pulp.

5. A container according to claim 1, in which the container includes a seal for sealing the dispensing aperture comprising a plug or stopper which is removable and replaceable in the dispensing aperture of the container, a foil or other layer which seals the dispensing opening of the container and is peelable or otherwise removable from the opening when contents are to be dispensed, or a screw cap.

6. A container according to claim 1, in which the dispensing aperture is resealable via an adhesive tape.

7. A container according to claim 1, in which the portion of the bag or liner provided within the hollow shell has a maximum internal volume greater than the internal volume of the shell.

8. A container according to claim 1, in which the bag or liner is provided loosely within the shell.

9. A container according to claim 1, in which the bag or liner is formed of a biodegradable material.

10. A container according to claim 1, in which the hollow shell is provided with a moisture resistant covering on the outer surface.

11. A container according to claim 1, in which the neck portion is a spout that is formed separately from the remainder of the shell.

12. A container according to claim 11, in which the neck portion includes a flange or extension member for connection to the hollow shell.

13. A container according to claim 12, in which the neck portion is attached to the hollow shell by an adhesive or mechanical connection.

14. A container according to claim 11, in which the bag or liner is attached to the neck portion before the neck portion is attached to the hollow shell.

15. A container according to claim 1, in which the shell includes at least one of an extension portion, a tab and an extension feature arranged to extend over and attach to another portion of the shell to assemble the hollow shell.

16. A container according to claim 1, in which the shell includes one or more flanges that are joined together to join one or more parts of the shell.

17. A container according to claim 16, in which the flange includes an opening to define a handle portion for holding the container.

18. A container according to claim 17, including an extension piece arranged to be folded over the flange so that the handle portion has multiple thicknesses of material to provide a strong handle.

19. A container according to claim 1 wherein the internal volume of the hollow shell and the maximum internal volume of the bag or liner are sized such that the load of the bag or liner when filled is carried by the hollow shell rather than the load being supported by a portion of the bag or liner that is secured about the dispensing aperture of the container.

20. A container according to claim 1 in which the open end of the bag extends through the dispensing aperture of the shell.

* * * * *